United States Patent
Halcrow et al.

(10) Patent No.: US 7,257,373 B2
(45) Date of Patent: Aug. 14, 2007

(54) METHOD AND APPARATUS FOR DETERMINING ADJACENCY OF WIRELESS DEVICE TO POS TERMINAL

(75) Inventors: Michael A. Halcrow, Pflugerville, TX (US); Serge E. Hallyn, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 389 days.

(21) Appl. No.: 10/965,141

(22) Filed: Oct. 14, 2004

(65) Prior Publication Data

US 2006/0084448 A1 Apr. 20, 2006

(51) Int. Cl.
  *H04B 7/00* (2006.01)
(52) U.S. Cl. ............... 455/41.2; 455/558; 455/406; 455/67.11; 455/63.1; 455/67.13; 455/115.3; 455/115.1; 705/26; 235/380; 235/462.13; 713/186; 713/176
(58) Field of Classification Search ............... 455/41.2, 455/558, 403, 406; 705/26; 382/124; 713/186
  See application file for complete search history.

(56) References Cited

U.S. PATENT DOCUMENTS

| | | | |
|---|---|---|---|
| 6,179,206 B1 * | 1/2001 | Matsumori | 235/383 |
| 6,513,015 B2 * | 1/2003 | Ogasawara | 705/26 |
| 6,783,071 B2 * | 8/2004 | Levine et al. | 235/462.13 |
| 6,850,147 B2 * | 2/2005 | Prokoski et al. | 340/5.53 |
| 6,940,492 B2 * | 9/2005 | Maritzen et al. | 345/173 |
| 7,003,495 B1 * | 2/2006 | Burger et al. | 705/50 |
| 7,110,792 B2 * | 9/2006 | Rosenberg | 455/558 |
| 7,133,659 B2 * | 11/2006 | Zalewski et al. | 455/403 |
| 7,142,813 B1 * | 11/2006 | Desai | 455/41.2 |

* cited by examiner

*Primary Examiner*—Marceau Milord
(74) *Attorney, Agent, or Firm*—Synnestvedt & Lechner LLP; Diana L. Roberts

(57) ABSTRACT

One or more stationary wireless readers are used to determine the relative strength of calibration signals sent from fixed locations adjacent to POS terminals. Then, the signal strength of signals being transmitted by wireless devices within range of the one or more wireless readers is evaluated to determine the relative position of each wireless device to the POS terminals. This allows an operator of the POS system to determine the proximity of each wireless device relative to the POS terminals.

15 Claims, 2 Drawing Sheets

METHOD AND APPARATUS FOR DETERMINING ADJACENCY OF WIRELESS DEVICE TO POS TERMINAL

BACKGROUND OF THE INVENTION

1. Field of the Invention

This invention relates to wireless point of sale systems and, more particularly, to wireless payment systems used in connection with point of sale terminals.

2. Description of the Related Art

Wireless payment systems (also known as "mobile commerce systems") promise to become ubiquitous as enabling wireless devices such as cellular phones and PDAs proliferate the consumer market. Multiple companies are vying for a market share of the wireless payment market, competing with respect to standards and implementations.

Typically, a vendor will set up one or more point of sale terminals (POS terminal) in a vendor location and configure the POS terminals to communicate with the wireless devices of customers visiting the vendor location. The vendor, when choosing to communicate with a customer's wireless device via a POS terminal, must be able to associate the correct device with a particular transaction being performed at a particular POS terminal. For example, if there are five POS terminals next to each other and a customer is checking out on terminal #3, his wireless device may be within communication range of the other four POS terminals. Further, there may be ten or more other customers standing in line among all of the five terminals, and each may have wireless devices (cell phones, Bluetooth-equipped PDAs, etc.) and each of them will be within range of all five of the POS terminals.

A problem encountered with such systems is coming up with a way to assure that once the customer checking out at a particular terminal, e.g., POS terminal #3, has had his or her items scanned, and thus the terminal is ready to perform the wireless payment transaction, POS terminal #3 can be associated with the proper wireless device to complete the financial transaction.

One method of making this association is to have the customer initiate a physical contact with a device at the POS terminal, linking his or her wireless device to the POS terminal (e.g., insert the device into a cradle); this, however, defeats the purpose of a wireless system, since the device is physically connected to the POS terminal.

Another option is to have POS terminal #3 (in this example) broadcast a query to all devices in its proximity, requesting the customer at POS terminal #3 to indicate that his or her device is the correct one. This suffers the problem that someone else could "hijack" the session by falsely acknowledging that he or she is the customer at POS terminal #3, when in reality he or she may be at POS terminal #2, or worse, outside the store altogether. This might enable an unscrupulous person to perform unauthorized tasks, such as to identify what others are purchasing, obtain confidential financial information, and/or obtain data that could be used for "spamming". When the POS terminal sends the transaction details to the inappropriate device, it is confusing and inconvenient, and the real customer loses privacy. In addition, all of the customers are inconvenienced by the incessant broadcast queries being received on their wireless devices. Further, requiring the customer to push an extra button on their wireless device decreases the transparency of the wireless payment process.

Accordingly, it would be desirable to have a wireless payment system which is essentially transparent to the user but which can accurately, dependably and automatically associate the correct wireless device with the correct point of sale terminal to complete the transaction.

SUMMARY OF THE INVENTION

The present invention makes use of one or more stationary devices capable of reading and measuring signal strengths of wireless devices (e.g., wireless readers, access points, wireless access points) to determine the relative strength of signals that are received by them. The signal strength for any wireless devices within range of a signal strength reader is evaluated to determine the relative position of each wireless device to multiple POS terminals, and identifies the appropriate wireless device based upon it being determined, automatically, to be the closest in proximity to a particular POS terminal on which a transaction is being conducted.

DETAILED DESCRIPTION OF THE PREFERRED EMBODIMENTS

Figure 1:
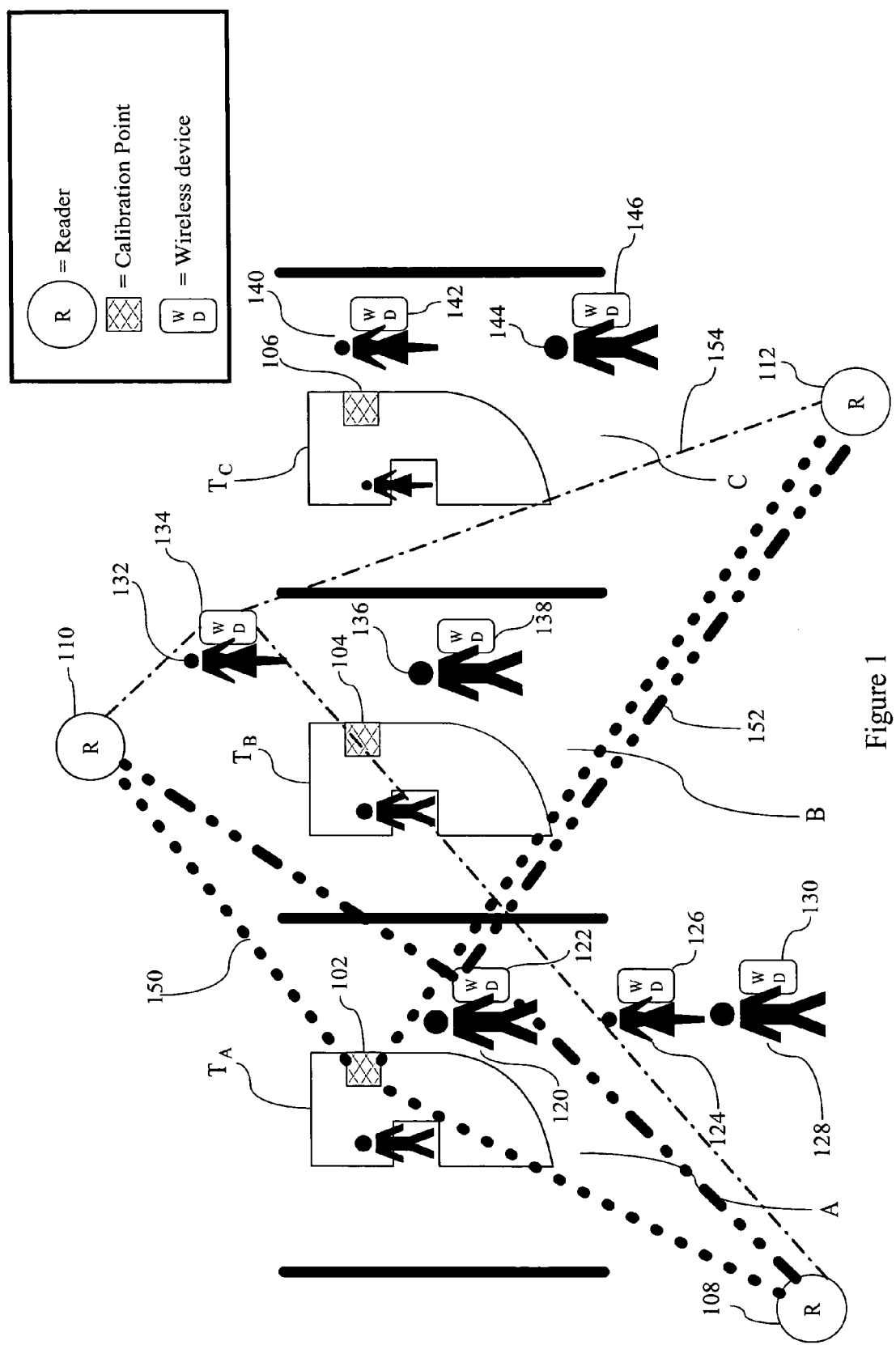
FIG. 1 is a block diagram illustrating an exemplary installation of a system in accordance with the present invention.

FIG. 1 is a block diagram illustrating an exemplary installation of a system in accordance with the present invention. The example illustrated in FIG. 1 shows a three-aisle configuration (aisles A, B, and C) in which are situated POS terminals $T_A$, $T_B$, and $T_C$, respectively. Each POS terminal includes a processor, e.g., a computer, that ties into a central processor where POS data is stored (the use of local and central processing systems of this kind with POS systems is very well known; thus, the local and central processor are not illustrated herein). Such a configuration is well-known in the art. The layout illustrated in FIG. 1 is typical of a retail implementation of the present invention. It is understood that the present invention is not limited to a retail implementation (i.e., it can be utilized anywhere in which identification of the proximity of a wireless device to a reference point is desired) and that fewer or greater numbers of POS terminals may be used and still fall within the scope of the present invention.

As shown in FIG. 1, three stationary signal strength readers 108, 110, and 112, are situated in an equilateral triangle pattern around the POS terminals $T_A$, $T_B$, and $T_C$. The signal strength readers can be any device capable of measuring signal strengths of wireless devices in their proximity. Although dedicated signal strength readers may be used, it is contemplated that in most situations a device such as an access point (e.g., a wireless broadband router, a Bluetooth router, etc.) that performs multiple functions, including the reading of signal strengths, will be used. These devices would typically be used to process communication between the user and the store and would be connected to the store's network, and are typically located at locations in the vicinity of, but not next to, the POS terminals. Each signal strength reader is coupled to or couplable to, the central processor of the POS system and thus can communicate with each POS terminal.

With one exception, the actual location of the set of signal strength readers does not matter, though in the preferred embodiment they are in an equilateral triangular pattern. The method of the present invention will function with only two readers or with readers that are not arranged in an equilateral triangular pattern, as long as the POS terminals are positioned in a manner whereby no two POS terminals are equally distant from each of the signal strength readers. It is also contemplated that a single signal strength reader, shielded so that it only reads signal strengths from the vicinity of the POS terminals, can be utilized, although in the preferred embodiment, two or more signal strength readers are used.

As part of a set-up process, a calibrator of the system (or an installer, administrator, etc.) calibrates the system by standing adjacent to each of the POS terminals, at a fixed calibration point, with a wireless device. Using the wireless device, the system administrator indicates which POS terminal he or she is standing next to (to allow later identification of the data to be obtained), and each signal strength reader registers a signal strength value that quantifies the signal strength relative to that POS terminal. These values are obtained for all POS terminals in the system and are stored on the central processor of the POS system. For example, in the configuration illustrated in FIG. 1, the calibrator, while calibrating the system, stands next to each terminal with a wireless device while transmitting a calibration signal from the wireless device. Preferably the wireless device used for calibration has a higher broadcasting power level than will usually be encountered from "regular" wireless devices during ordinary use of the system. The stronger the signal from the wireless device used for calibration, the more accurate future readings will be from other wireless devices that emit weaker signals.

Since the signal strength of different wireless devices will vary depending upon several factors, including battery strength, physical obstructions, and individual device characteristics, and since the positioning of the wireless devices will affect the percentage strength values calculated at each of the aisles (i.e., it is unlikely that customers will always be standing precisely at the calibration points), the signal strengths measured (and percentages calculated by the readers, discussed below) must be normalized against one another in a ratio. In the example illustrated in FIG. 1, the calibrator places the calibrating device on calibration point 102 of POS terminal $T_A$, and reader 108 measures an arbitrary signal strength value of 86, reader 110 measures a value of 92, and reader 112 measures a value of 62 (the signals are illustrated in FIG. 1 by dotted lines 150) (typically signal strength measurements would be measured in decibels (dB), with typical values in a range from 0 dB to 15 dB for 802.11 networks and less for Bluetooth. For the purpose of this example, however, arbitrary values (no units specified) are used for simplicity.). Relative to the aggregate of these readings, reader 108 receives 36% of the total signal, reader 110 receives 38% of the total signal, and reader 112 receives 26% of the total signal. This makes sense, since reader 110 (with 38%) is closest in proximity to calibration point 102, reader 108 (with 36%) is second-closest to calibration point 102, and reader 112 (with 26%) is farthest from calibration point 102. Each of the remaining terminals ($T_B$ and $T_C$ in this example) have similar readings taken (with respect to POS terminal $T_B$, at calibration point 104, and with reference to POS terminal $T_C$, at calibration point 106) and each of the values are stored in a server connected to the system and kept for future use. The system is then ready for use.

In use, a customer 120 carrying wireless device 122 walks into the store with a standard wireless device. The customer obtains whatever items they are shopping for and stands next to terminal $T_A$ as shown in FIG. 1, to make a purchase. When the items are totaled, the system automatically takes readings (signal strength measurements) from all wireless devices emitting wireless signals that are measurable by the wireless readers. In this example, reader 108 measures a value of 46, reader 110 measures a value of 43, and reader 112 measures a value of 31 with respect to wireless device 122 (these signals are illustrated by the repeating "dot-dot-dash" lines 152 in FIG. 1). These values equate to 38%, 36%, and 26% of the total signal, respectively. The square of the differences between the reference signal percentages and the measured signal percentages is then taken to determine an "adjacency metric". Thus, in this example, the equation is as follows: $(36-38)^2+(38-36)^2+(26-26)^2=4+4+0=8$.

The same calculation process is repeated for each of the reference values for the other wireless devices that are transmitting measurable signals. Any devices located at areas further from POS terminal $T_A$ will have strength values relative to POS terminal $T_a$ that differ significantly more than those measured with respect to wireless device 122. This will result in an adjacency metric for each of these other devices that is higher than that of wireless device 122. For example, suppose strength measurements of 33, 49, and 38 are measured at Readers 108, 110, and 112, respectively, for wireless device 138, located in aisle B (these signals are illustrated by the repeating "dot-dash" lines 154 in FIG. 1). This means that Reader 108 receives 27% of the signal, reader 110 receives 41% of the signal, and reader 112 receives 32% of the signal from wireless device 138. Taking the square of the differences between the values measured with respect to wireless device 138 and the values measured at calibration point 102 of POS terminal $T_A$, you get: $(36-27)^2+(38-49)^2+(26-32)^2=81+121+36=238$. The lowest adjacency metric is selected as identifying the wireless device that is closest to the terminal where the completed transaction is being processed, in this example, terminal $T_A$. Based on this calculation, wireless device 122 (possessed by user 120 standing at POS terminal $T_A$) is identified as being the appropriate wireless device for use in the current transaction being performed at POS terminal $T_A$.

Figure 2:
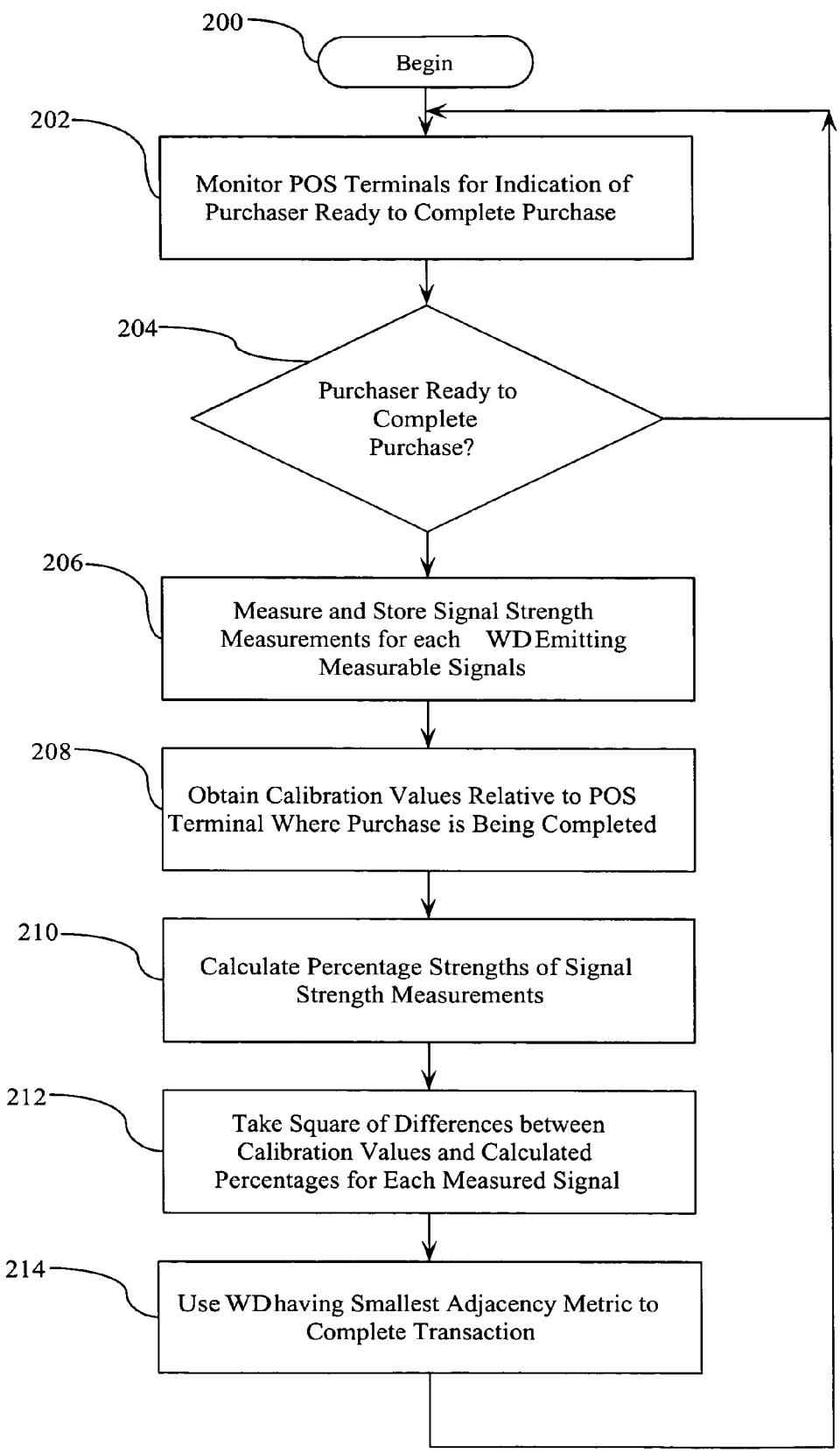
FIG. 2 is a flowchart illustrating an example of the basic steps performed in accordance with the use and operation of the present invention.

FIG. 2 is a flowchart illustrating an example of the basic steps performed in accordance with the use and operation of the present invention. At step 200, the process begins, and proceeds to step 202, where the POS terminals are monitored for an indication of a purchaser ready to complete a purchase. This indication could come via any known means, for example, when an operator of the POS system performs an operation that totals all of the purchases and presents the total amount to the customer. On a cash register, for example, this could be performed by simply pressing a "total" button on the cash register which then totals all the items, adds up tax and any other charges, and displays the amount due. The processor is preferably configured to automatically issue an indication that a transaction is ready for completion when the purchases are totaled; however, it is understood that numerous other methods for issuing such an indication (e.g., by manual selection of a "ready-to-complete" key) will be apparent to a system designer.

At step 204, a determination is made as to whether or not there are any POS terminals at which a purchase is being completed. If there are not, the process proceeds back to step 202 for further monitoring. However, if at step 204 a determination is made that there is a POS terminal conducting a transaction that is ready for completion, the process proceeds to step 206, and the signal strengths for each wireless device emitting measurable signals are measured and stored in the processor (either on the local processor associated with the POS terminal conducting the transaction or the central processor for the entire POS system). At step 208, the calibration values relative to the POS terminal where the purchase is being completed are obtained, e.g., from a look-up table on the processor.

At step 210, the percentage strengths of the signal strength measurements for each of the wireless devices emitting measurable signals are calculated, and at step 212, the square of the differences between the calibration values relative to the POS terminal where the purchase is being completed, and the calculated percentages for each measured signal, are taken. At step 214, the wireless device having the smallest adjacency metric, as calculated in step 212, is determined to be the wireless device associated with the purchase being completed, and the transaction is completed wirelessly by transfer of financial information and/or the performance of any other steps required to complete the transaction. The process then proceeds back to step 202 where the POS terminals continue to be monitored for additional completed purchases.

The system of the present invention above has a property that increasing the number of readers increases the accuracy of the determination of POS terminal adjacency. As will be appreciated by one skilled in the art, the technique and system of the present invention is scalable to any arbitrary number of POS terminals, clients, and readers.

Following are a set of equations that describe, generally, the above-described approach of the present invention for determining the adjacency of wireless devices to a POS terminal.

Let $T_t$ be the terminal to which the calibrator indicates he is adjacent. Then for each reader (r), the normalized calibrated reading is:

$$Calib_{T,r} = \left( \frac{Orig_r}{\sum_{i=0}^{NumReaders} \{Orig_i\}} \right) * 100$$

When it comes time to determine the terminal to which any particular client is adjacent, first the client's readings for each reader are normalized:

$$Actual_{cr} = \left( \frac{Orig_{cr}}{\sum_{i=0}^{NumReaders} (Orig_{ci})} \right) * 100$$

The client's score for each terminal is then determined:

$$Score_{cT_t} = \sum_{r=0}^{NumReaders} (Calib_{T,r} - Actual_{cr})^2$$

Finally, in order to determine which client is closest to any given terminal, the client with the lowest score for that terminal is selected:

$$Client_{T_1} = min\ [Score_{cT_1} | 0 \leq c \leq NumClients]$$

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as permanent storage of the central POS processor. In a client/server environment, such software programming code may be stored with storage associated with a server. The software programming code may be embodied on any of a variety of known media for use with a data processing system, such as a diskette, or hard drive, or CD ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, FIGS. 1-2 support combinations of means for performing the specified functions, combinations of steps for performing the specified functions, and program instruction means for performing the specified functions.

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

We claim:

1. A method of determining, using one or more signal strength readers, the proximity of wireless devices relative to a reference point, comprising the steps of:

accessing signal strength calibration data associated with said reference point;

measuring the transmission strength of wireless transmissions from all wireless devices within range of said one or more signal strength readers;

comparing the signal strength calibration data with the measured transmission strength of the wireless transmissions of each of said wireless devices within range of said one or more signal strength readers;

identifying the proximity of said transmitted devices relative to said reference point based on said comparison;

measuring, relative to said one or more signal strength readers, the strength of a calibration signal generated at said reference point; and storing said measured calibration signal strength value as said signal strength calibration data;

wherein said proximity identifying step comprises the steps of:

calculating an adjacency metric for each of said wireless devices within transmission range of said one or more signal strength readers; and identifying the wireless device having the lowest adjacency metric as being closest to said reference point.

2. The method of claim 1, wherein said adjacency metric is calculated by taking the square of the differences between the signal strength calibration data and the measured transmission strength of said wireless devices; and identifying as the wireless device closest to said reference point the wireless device having the lowest adjacency metric.

3. The method of claim 1, wherein said measuring steps are performed relative to at least two signal strength readers.

4. The method of claim 1, wherein said signal strength readers comprise an 802.11 access point.

5. The method of claim 1, wherein said signal strength reader comprises a Bluetooth access point.

6. A system of determining, using one or more signal strength readers, the proximity of wireless devices relative to a reference point, comprising:

means for accessing signal strength calibration data associated with said reference point;

means for measuring the transmission strength of wireless transmissions from all wireless devices within range of said one or more signal strength readers;

means for comparing the signal strength calibration data with the measured transmission strength of the wireless transmissions of each of said wireless devices within range of said one or more signal strength readers; and means for identifying the proximity of said transmitted devices relative to said reference point based on said comparison;

means for measuring, relative to said one or more signal strength readers, the strength of a calibration signal generated at said reference point; and means for storing said measured calibration signal strength value as said signal strength calibration data wherein said proximity identifying means comprises:

means for calculating an adjacency metric for each of said wireless devices within transmission range of said one or more signal strength readers; and means for identifying the wireless device having the lowest adjacency metric as being closest to said reference point.

7. The system of claim 6, wherein said adjacency metric is calculated by taking the square of the differences between the signal strength calibration data and the measured transmission strength of said wireless devices; and identifying as the wireless device closest to said reference point the wireless device having the lowest adjacency metric.

8. The system of claim 6, wherein said measuring steps are performed relative to at least two signal strength readers.

9. The system of claim 6, wherein said signal strength readers comprise an 802.11 access point.

10. The system of claim 6, wherein said signal strength reader comprises a Bluetooth access point.

11. A computer program product for determining, using one or more signal strength readers, the proximity of wireless devices relative to a reference point, the computer program product comprising a computer-readable storage medium having computer-readable program code embodied in the medium, the computer-readable program code comprising:

computer-readable program code that accesses signal strength calibration data associated with said reference point;

computer-readable program code that measures the transmission strength of wireless transmissions from all wireless devices within range of said one or more signal strength readers;

computer-readable program code that compares the signal strength calibration data with the measured transmission strength of the wireless transmissions of each of said wireless devices within range of said one or more signal strength readers; and computer-readable program code that identifies the proximity of said transmitted devices relative to said reference point based on said comparison;

computer-readable program code that measures, relative to said one or more signal strength readers, the strength of a calibration signal generated at said reference point; and computer-readable program code that stores said measured calibration signal strength value as said signal strength calibration data wherein said proximity identifying step comprises:

computer-readable program code that calculates an adjacency metric for each of said wireless devices within transmission range of said one or more signal strength readers; and computer-readable program code that identifies the wireless device having the lowest adjacency metric as being closest to said reference point.

12. The computer program product of claim 11, wherein said adjacency metric is calculated by taking the square of the differences between the signal strength calibration data and the measured transmission strength of said wireless devices; and identifying as the wireless device closest to said reference point the wireless device having the lowest adjacency metric.

13. The computer program product of claim 11, wherein said measuring steps are performed relative to at least two signal strength readers.

14. The computer program product of claim 11, wherein said signal strength readers comprise an 802.11 access point.

15. The computer program product of claim 11, wherein said signal strength reader comprises a Bluetooth access point.

* * * * *